(12) United States Patent
Nairn (10) Patent No.: US 7,429,944 B1
(45) Date of Patent: Sep. 30, 2008

(54) CONVERTER SYSTEMS HAVING REDUCED-JITTER, SELECTIVELY-SKEWED INTERLEAVED CLOCKS

(75) Inventor: David Graham Nairn, Waterloo (CA)

(73) Assignee: Analog Devices, Inc., Norwood, MA (US)

( * ) Notice: Subject to any disclaimer, the term of this patent is extended or adjusted under 35 U.S.C. 154(b) by 2 days.

(21) Appl. No.: 11/726,293

(22) Filed: Mar. 20, 2007

(51) Int. Cl.
    *H03M 1/12* (2006.01)
(52) U.S. Cl. ............................ 341/155; 341/156
(58) Field of Classification Search ............... 341/155, 341/156; 327/149, 158
    See application file for complete search history.

(56) References Cited

U.S. PATENT DOCUMENTS

| | | | |
|---|---|---|---|
| 4,833,445 A | 5/1989 | Buchele | 341/118 |
| 5,886,562 A | 3/1999 | Garrity et al. | 327/415 |
| 6,313,780 B1 | 11/2001 | Hughes et al. | 341/146 |
| 6,484,268 B2 | 11/2002 | Tamura et al. | 713/600 |
| 6,525,577 B2 * | 2/2003 | Lee | 327/149 |
| 6,542,017 B2 | 4/2003 | Manganaro | 327/291 |
| 7,053,804 B1 | 5/2006 | Nairn | 341/118 |

OTHER PUBLICATIONS

Looney, Mark, "Advanced Digital Post-Processing Techniques Enhance Performance in Time-Interleaved ADC Systems", Analog Dialogue, vol. 37, Aug. 2003, 5 pages.

* cited by examiner

*Primary Examiner*—Jean B Jeanglaude
(74) *Attorney, Agent, or Firm*—Koppel, Patrick, Heybl & Dawson (57) ABSTRACT

Converter systems are provided that use particular combinations of fixed and variable clock skewers to generate interleaved clock signals for the systems. These combinations have been found effective in accurately generating selectively-skewed clocks while simultaneously restricting the jitter that generally accompanies the skewing process.

20 Claims, 7 Drawing Sheets

CONVERTER SYSTEMS HAVING REDUCED-JITTER, SELECTIVELY-SKEWED INTERLEAVED CLOCKS

BACKGROUND OF THE INVENTION

1. Field of the Invention

The present invention relates generally to interleaved signal converters.

2. Description of the Related Art

The operation of all analog-to-digital converters must be restricted to a maximum clock rate $R_{max}$ that each converter is capable of achieving. N converters are often arranged in interleaved systems which utilize N interleaved clock signals so that the system can operate at a significantly-higher system rate which is substantially $NR_{max}$. The performance of such interleaved systems, however, has often been substantially degraded because their interleaved clock signals were not accurately positioned. In addition, the process of positioning has often contributed excessive jitter to the clock signals which further degrades system performance.

BRIEF SUMMARY OF THE INVENTION

The present invention is generally directed to interleaved converter systems which generate low-jitter, selectively-skewed time-interleaved clock signals for use in signal conversion. The drawings and the following description provide an enabling disclosure and the appended claims particularly point out and distinctly claim skew networks that selectively delay a clock signal along a clock path in response to a delay command and equivalents thereof.

DETAILED DESCRIPTION OF THE INVENTION

FIGS. 1-7 illustrate clock embodiments which provide low-jitter, selectively-skewed time-interleaved clock signals to facilitate the realization of interleaved converter systems. These clock signals are generated with combinations of fixed and variable clock skewers which are especially configured to provide clock signals that are selectively-skewed to enhance system accuracy while simultaneously reducing jitter that typically accompanies such skewing.

Figure 1:
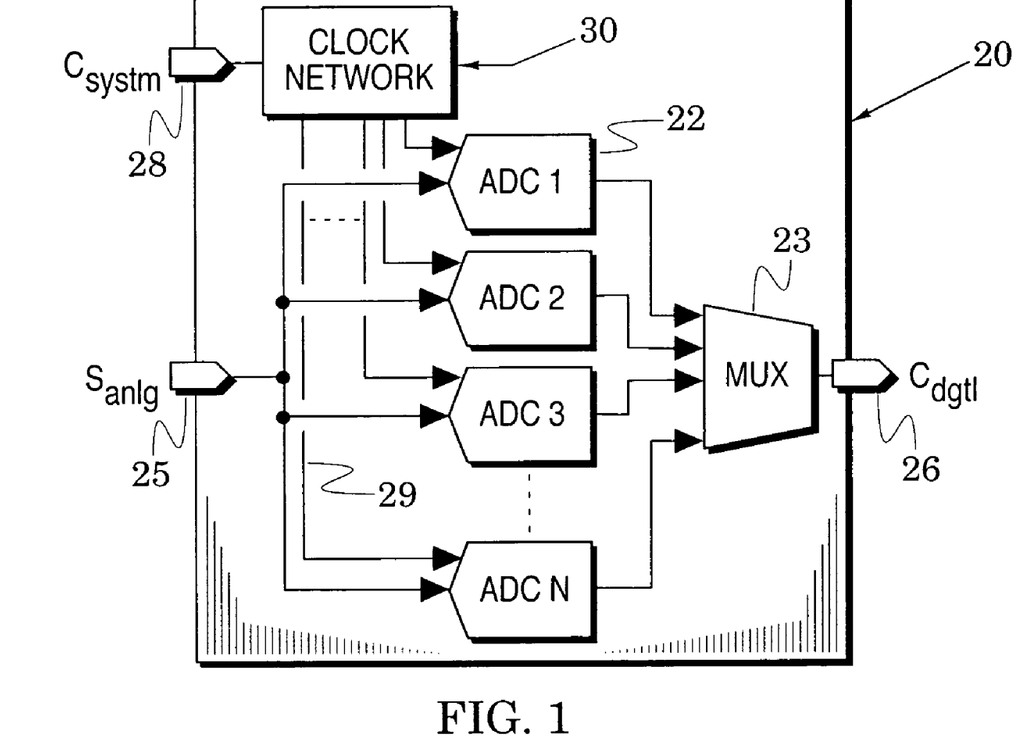
FIG. 1 is a block diagram of a signal converter embodiment of the present invention that has reduced-jitter, selectively-skewed clocks.

In particular, the signal converter system 20 of FIG. 1 includes N analog-to-digital converters 22, a multiplexer (MUX) 23 and a clock network 30. The converters 22 receive an analog input signal $S_{anlg}$ from an input port 25 and provide digital signals to the multiplexer 23 which temporally multiplexes these signals into a digital code $C_{dglt}$ at an output port 26 wherein the digital code corresponds to the analog input signal. The clock network 30 responds to a system clock $C_{sysm}$ received from a clock port 28 and provides time-interleaved clock signals 29 to the signal converters 22.

In response to its respective one of the interleaved clock signals 29, each converter 22 samples the analog input signal $S_{anlg}$ and provides corresponding digital signals to the multiplexer 23. To accomplish this function, the converters may be configured with a variety of converter structures (e.g., pipelined structures). Although the conversion of each converter is restricted to the converters' maximum clock rate $R_{max}$, the interleaved arrangement allows the converter system 20 to operate at a significantly-higher system rate that is substantially $NR_{max}$.

In addition to not violating the maximum operating rate of each signal converter 22, the time-interleaved clock signals 29 must be accurately temporally controlled (skewed) so that each sample is precisely aligned as initially indicated by the system clock $C_{sysm}$. Failure to accomplish this alignment leads to degradation of measurements of system accuracy (e.g., degradation of spurious-free dynamic range (SFDR) or signal-to-noise-plus-distortion (SNDR)).

A number of factors such as unavoidable manufacturing and layout errors (e.g., differences in chip signal path lengths) cause the samples taken inside the converters 22 to temporally differ from the times initially set by the system clock $C_{sysm}$. Therefore, it has generally been found necessary to purposefully skew the interleaved clock signals 29 while observing appropriate measures of system accuracy. The clock signals are properly skewed when such measurements are enhanced (i.e., preferably maximized). It has been found, however, that skewing unavoidably introduces jitter into the interleaved clock signals with consequent degradation of the system's signal-to-noise ratio. The present invention is therefore directed to the reduction of jitter during the process of skewing of the interleaved clock signals.

It has been determined that an interleaved timing accuracy on the order of 10 femtoseconds (fs) is required to reduce spurious output tones 80 dB below the desired signal in an interleaved system operating in a sequential mode at 1 gigasample per second (GSPS) with 12 bit converters. When the same system operates in a random mode, this accuracy requirement may be relaxed to approximately 45 fs (the sequential and random modes will be subsequently addressed in greater detail). Conversely, it has also been determined that a skewing range on the order of 400 picoseconds (ps) should be available to counter the timing error factors referred to above.

It is also known that system signal-to-noise (SNR) performance generally varies inversely with analog input frequency and with system sampling jitter. In a four converter system having a system sample rate of 1GSPS and an input signal frequency at the Nyquist frequency of 500 megahertz (MHz), for example, each converter may have an SNR on the order of 67 dB. If it is desired to restrict the jitter-contributed noise to a similar value, the sampling jitter must be held below 140 fs which presents a considerable challenge.

Therefore, exemplary clocking goals are to keep sampling jitter from exceeding 140 fs while providing a skewing range of 400 ps with a skewing resolution of 45 fs (i.e., approximately 13 bits of skewing control). These clocking goals are realized with the clock generator embodiment 30 of FIG. 2 which has a plurality of clock paths 32 that lead from a common clock input port 33 to clock output ports 34 that provide the time-interleaved clocks (e.g., clk 1, clk 2 - - - clk N) to the converters (22 in FIG. 1). Each of the clock paths 32 begins with a steering gate 35 and terminates in a clock arbitrator 38. Between these path elements are arranged fixed and variable clock skewers 36 and 37.

Figure 2:
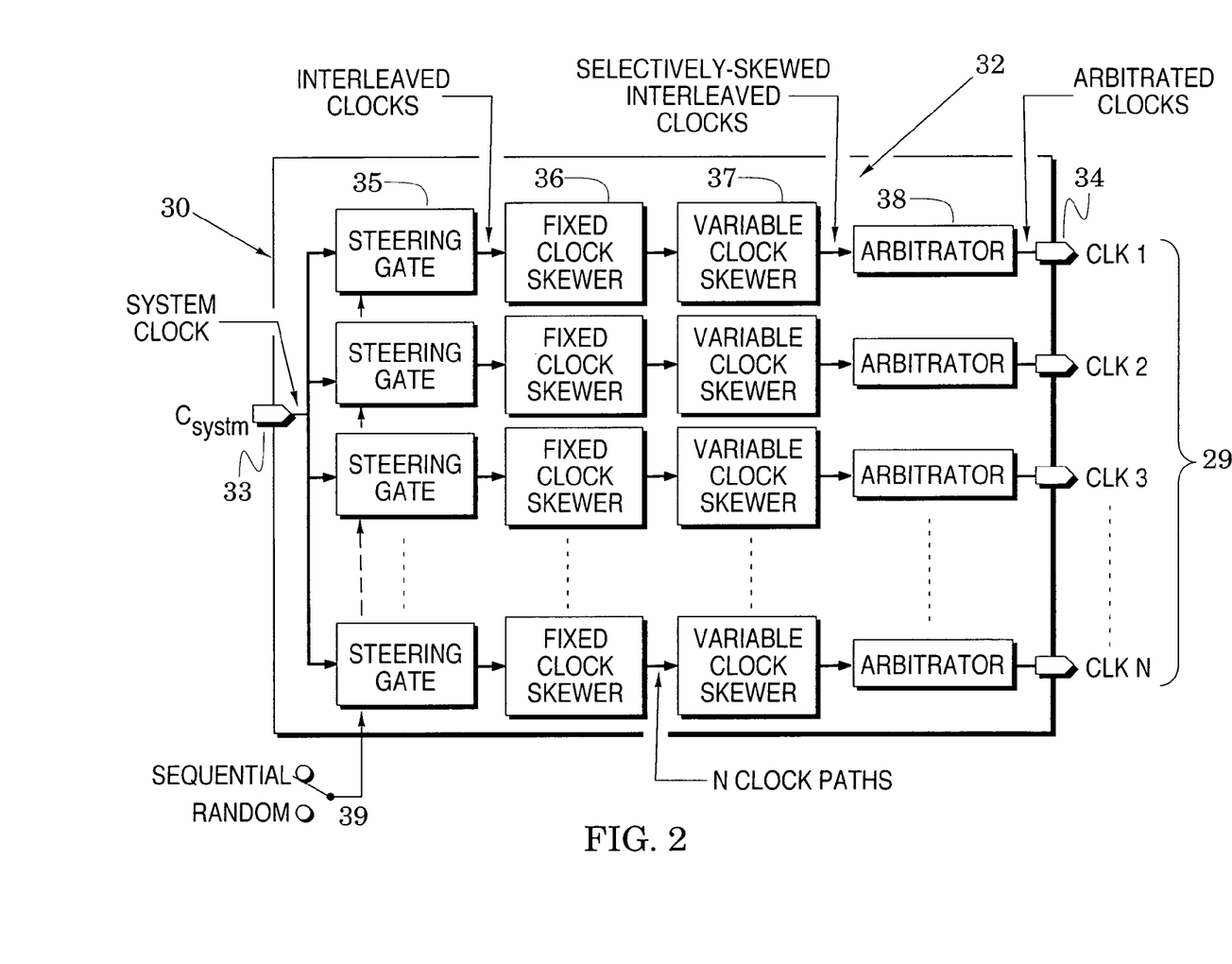
FIG. 2 is a block diagram of a clock network in the converter of FIG. 1.

The input port 33 receives the system clock $C_{sysm}$ which is typically generated by a master clock in the system of FIG. 1. The steering gates 35 are then arranged and activated to selectively steer pulses of the system clock signal along respective ones of the clock paths 32 to thereby generate the interleaved clock signals 29 at the output ports 34. In addition to this steering function, the steering gates control various pulse parameters (e.g., pulse width) and enhance system performance in particular applications by operating in various interleaving modes.

In an exemplary first mode, the steering gates may be activated in a sequential mode in which clock pulses sequentially appear in an unchanging pattern (e.g., clk 1, clk 2, clk 3, - - - clk N) at each of the output ports 34. In an exemplary second mode, these gates may be activated in a random mode in which clock pulses sequentially appear at each output port in a substantially random pattern. In this random mode, a portion of the pattern at an exemplary output port might appear as clk 3, clk 2, clk N, - - - clk 1. The random mode has the advantage that it converts spurious output tones (in the digital code $C_{dglt}$ at the output port 26 of FIG. 1) to noise. The pattern of the random mode, however, must be configured so that it does not require one of the converters (22 in FIG. 1) to operate at a rate that exceeds its maximum operating rate.

Each of the fixed clock skewers 36 of FIG. 2 is configured to provide selectable fixed delays that differ by predetermined time segments. The selected fixed delay is inserted into the respective one of the clock paths 32. Each of the variable clock skewers 37 is configured to insert a variable delay into its respective clock path 32 wherein the variable delay can be varied to span the corresponding time segment (of the corresponding fixed clock skewer) and can be selectively set to meet the timing goals described above.

Figure 3:
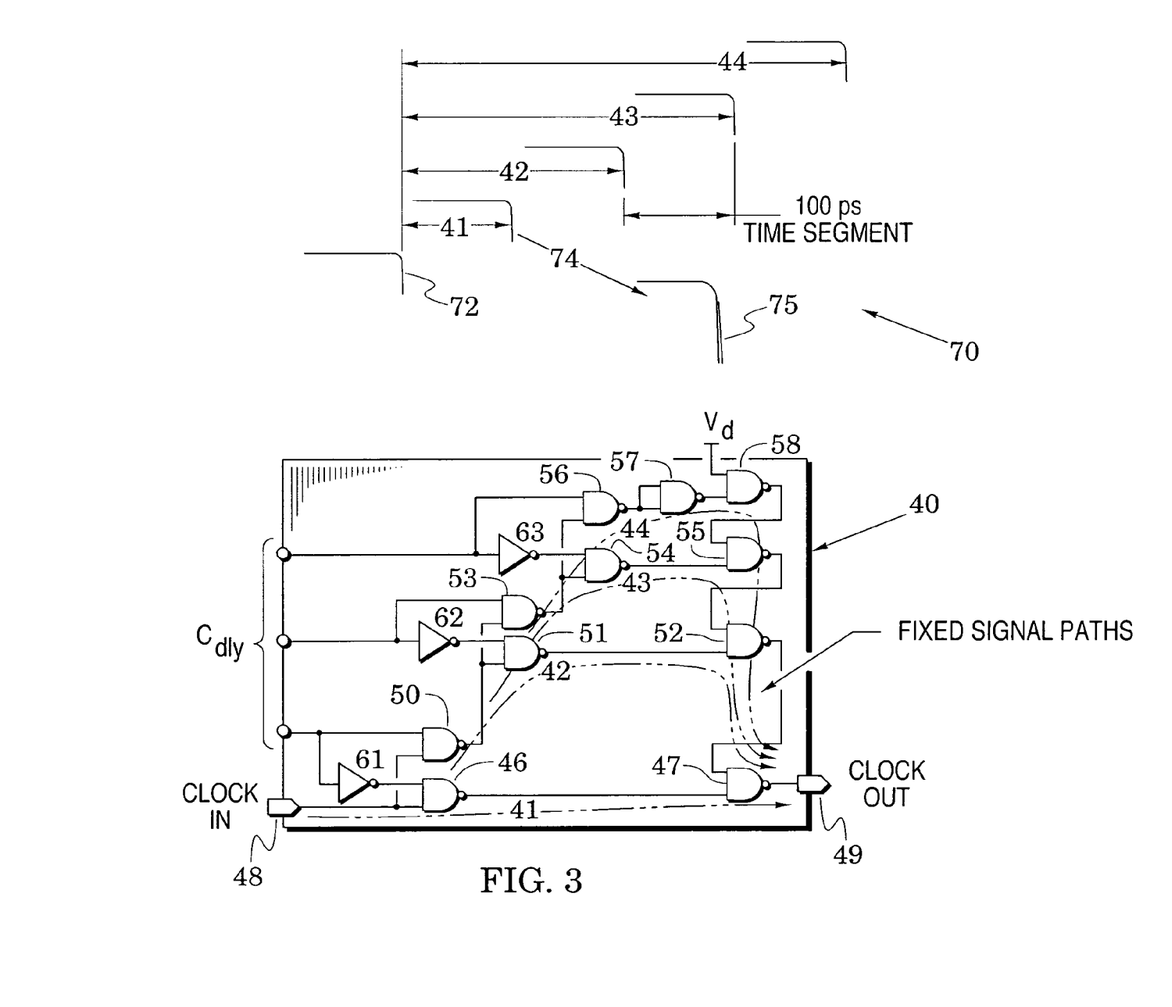
FIG. 3 shows an embodiment of a fixed clock skewer in the clock system of FIG. 2.

FIG. 3 illustrates an embodiment 40 of the fixed clock skewer which defines fixed signal paths 41-44 that differ by predetermined time segments. The first fixed signal path 41 is defined by input and output NAND gates 46 and 47 that are serially arranged between input and output ports 48 and 49. The second fixed signal path 42 replaces the input gate 46 with a gate 50 and inserts two gates 51 and 52 between the input and output gates 50 and 47.

The third fixed signal path 43 replaces the gate 51 of the second signal path with a gate 53 and inserts two gates 54 and 55 before the gates 52 and 47. Finally, the fourth fixed signal path 44 replaces the gate 54 of the third signal path with a gate 56 and inserts two gates 57 and 58 before the gates 55, 52 and 47. Thus, the first, second, third and fourth fixed signal paths respectively pass through two, four, six and eight gates. To provide for selection of different ones of the fixed signal paths, inverters 61, 62 and 63 respectively drive gates 46, 51 and 54 and receive delay commands $C_{dly}$ that are also provided to gates 50, 53 and 56. In addition, both inputs of gate 57 are driven by the gate 56.

With each gate providing a signal delay on the order of 50 ps, these fixed signal paths provide delays on the order of 100, 200, 300 and 400 ps which differ by 100 ps time segments. A timing graph 70 of FIG. 3 shows the falling edge of input pulses 72 at the input port 48 and falling edges of output pulses at the output port 49 when the different fixed signal paths 41-44 are selected. As shown, a 100 ps time segment is defined between each adjacent pair of output pulses. Although the leading edge of the pulses will be similarly shifted, it is assumed (for simplicity of illustration) that the falling edge initiates sampling in the converters (22 in FIG. 1) and is thus the parameter of greatest interest.

In an important feature of the present invention, the selectable delays of the timing graph 70 are generated by fixed-delay structures (e.g., the NAND gates of the fixed clock skewer 40) wherein a fixed-delay structure of the invention is one in which the adjustment of a clock edge is either minimal or nonexistent. For example, the arrow 74 indicates an enlargement of the falling edge along the fixed clock path 41 and shows that the falling edge has, at most, a minimal adjustment 75 of this edge. Such fixed-delay structures inherently provide high slew rate and the low timing jitter that is an important goal of the invention.

Figure 4A:
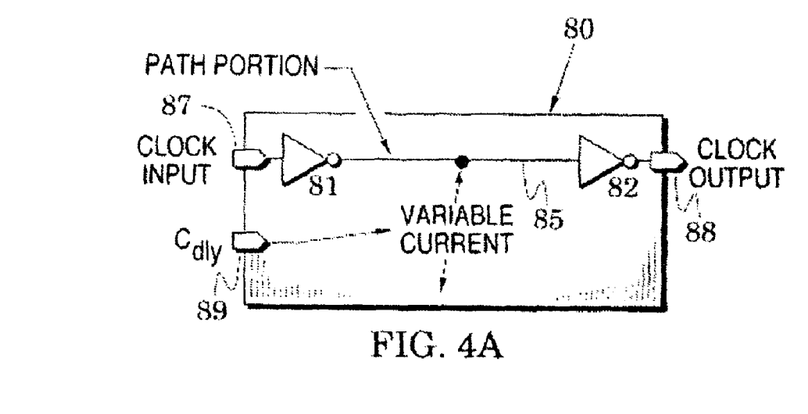
FIG. 4A shows an embodiment of a variable clock skewer in the clock system of FIG. 2.

FIG. 4A illustrates an embodiment 80 of the variable clock skewer 37 of FIG. 2. This embodiment inserts gates in the form of inverters 81 and 82 into the clock path (32 in FIG. 1) and spaces the gates to define a path portion 85. The variable clock skewer 80 receives clock inputs at an input port 87 and provides variably-delayed clock outputs at an output port 88. The embodiment 80 is configured to couple a variable current requirement to the path portion 85 wherein the current amplitude varies in response to a delay command $C_{dly}$ at a command port 89. In at least one embodiment, the variable current requirement may be configured to vary the total charge required to charge or discharge the path portion 85 (i.e., change the state of this path portion between 1 and 0). In an exemplary skewer embodiment described below with reference to FIG. 4C, the variable current requirement is realized with switched capacitors.

Figure 4B:
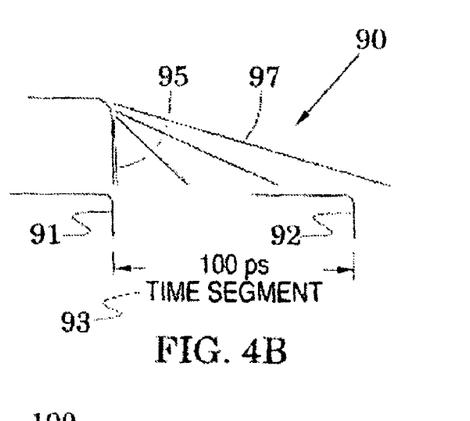
FIG. 4B is a sketch which illustrates the temporal relationship of variable delays in the variable clock skewer of FIG. 4A with each time segment of the fixed clock skewer of FIG. 3.

The timing graph 90 of FIG. 4B is directed to events at the path portion 85. The graph shows the falling edge 91 of an output pulse that has passed through a clock path (e.g., path 42) of the fixed clock skewer 40 of FIG. 3 and through inverter 81 with the delay command $C_{dly}$ set to its minimum values. Falling edge 92 illustrates the falling edge of an output pulse that has passed through an adjacent clock path (e.g., path 43) of the fixed clock skewer and through inverter 81 with the delay command $C_{dly}$ set to its minimum values. As previously described, these clock paths define (e.g., bound) a time segment 93. In an exemplary realization of the fixed clock skewer, this time segment was stated to be on the order of 100 ps.

FIG. 4B also shows the falling edge 95 of a pulse that has passed through the same clock path as edge 91 but with the delay command $C_{dly}$ set to a value slightly larger than its minimum value. As the variable current requirement of FIG. 4A increases in response to the delay command $C_{dly}$, the inverter 81 takes longer and longer to respond to clock pulses at the input port 87. Accordingly, the edges of clock pulses out of the inverter 81 become shallower and shallower as exemplified by different falling edges that terminate in falling edge 97. A pulse traveling through the path portion 85 can thereby be selectively delayed to span the time segment 93. Accordingly, the variable delay of the clock skewer 80 can be varied to span a selected time segment of the fixed clock skewer and can be selectively set to a value in that time segment by the delay command $C_{dly}$.

Figure 4C:
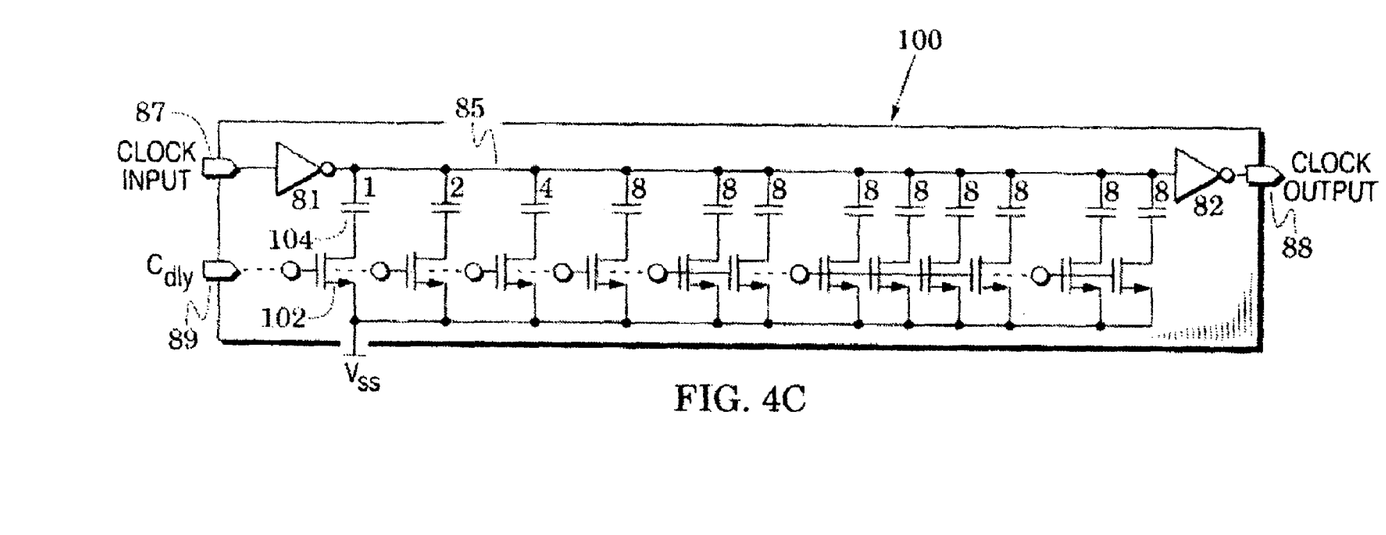
FIG. 4C is a detailed embodiment of the variable clock skewer of FIG. 4A.

FIG. 4C illustrates an embodiment 100 of the variable clock skewer which includes elements of the skewer 80 with like elements indicated by like reference numbers. In the embodiment 100, the variable current requirement of FIG. 4A is realized with transistors 102 and with capacitors 104 that are coupled between the transistors and the path portion 85.

The capacitors are preferably formed with unit capacitors that are sized to provide a selected unit skew (e.g., 2 ps). In one embodiment, these elements are arranged to form selectable capacitances that vary in a binary manner. For example, FIG. 4C shows 1, 2, 4 and 8 unit capacitors which can be selected by the delay command $C_{dly}$ at the command port 89. After these initial structures, capacitors are preferably arranged in groups of 8 to form 16 and 32 capacitor structures (the grouping of 8 capacitors facilitates chip layout goals). Although the positions of the transistors 102 and capacitors 104 can be interchanged in other skewer embodiments, the arrangement of FIG. 4C advantageously isolates parasitic capacitances of the transistors away from the path portion 85.

In a system embodiment in which the defined time segment of the fixed clock skewer 40 of FIG. 3 is on the order of 100 ps and each of the capacitors 104 is associated with a delay of 2 ps, the capacitor structures described above would provide a total delay of 126 ps (2×63). Although this is generally sufficient to span the 100 ps time segment, an additional set of 16 capacitors is added, for insurance, at the right side of the path portion to provide a total delay capability of 160 ps (2×80). To transition from 126 to 128 ps, an added set of 16 capacitors is provided adjacent the inverter 82. This additional set is activated as the 1, 2, 4 and 8 capacitors are deselected. This configuration and its enabled process enhances monotonicity as it alleviates matching errors. Preferably all selections are made when the pulse on the path portion 85 is in a low state to thereby eliminate charge storage effects.

Figure 5A:
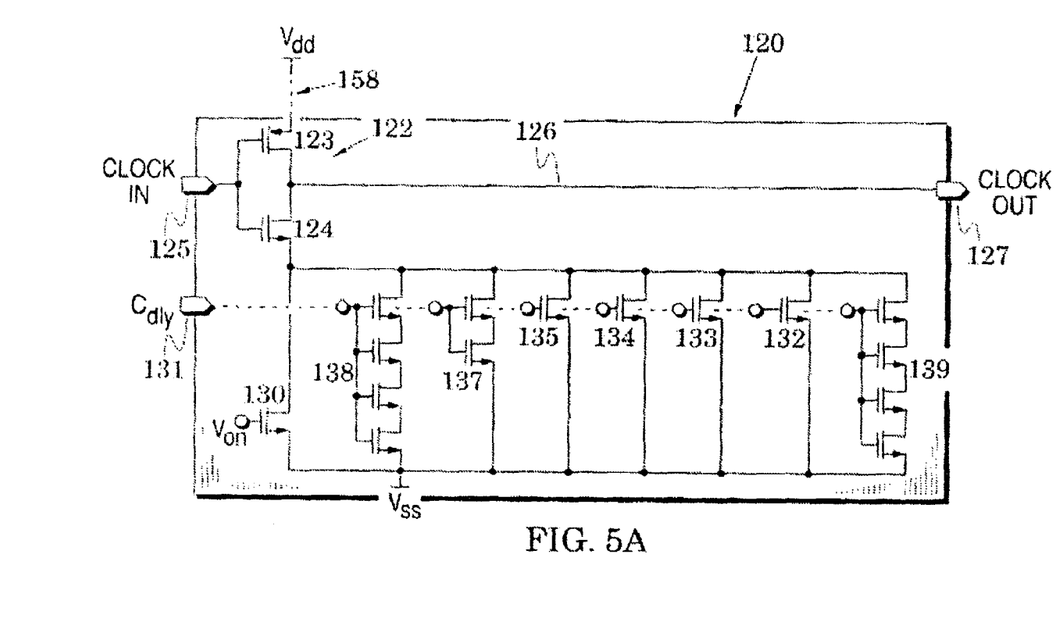
FIG. 5A shows another embodiment of a variable clock skewer in the clock system of FIG. 2.

To provide even finer resolutions, the variable clock skewer 120 of FIG. 5A can be added to the system. In this variable skewer, an inverter 122 (formed of transistors 123 and 124) is coupled to an input port 125 and a path portion 126 runs between the inverter and an output port 127. A transistor 130 is biased to be always on so that it couples current through the inverter as transistors 123 and 124 are alternately turned on by clock signals at the input port 125.

A plurality of resistive transistors are coupled to the inverter 122 and are selectively activated by the delay command $C_{dly}$ at a command port 131. Because of the voltage drop across the inverter 122, these transistors are biased into their triode mode so that they function as selectable resistances which can be selected by the delay command $C_{dly}$. These resistive transistors are preferably configured to provide impedances that vary in a binary manner. Accordingly, they determine binary current steps in the inverter 122.

In one embodiment, the channel width is varied so that transistor 132 has a small resistance and functions as a most-significant resistive bit. The channel width progressively narrows in transistors 133, 134 and 135 so that they provide greater resistances and act as less-significant bits. Further narrowing of the channel width may not be convenient so that serial arrangements of the transistor 135 are used to form the greater resistances of the least-significant bits 137 and 138. To further extend the range of timing skews, a transistor structure 139 for an additional least-significant bit may also be provided. This permits a bit count of 63 to be extended to 64.

It has been found that each least significant current bit provides a delay on the order of 20 f's so that the arrangement of FIG. 5A provides a maximum delay of ~1.2 Sps (20 fs×64). It is noted that the current transistor 130 generally has a significantly greater channel width than any of the transistors 132-138 so that its constant current is significantly greater than that of the transistors that respond to the delay command $C_{dly}$.

Figure 5B:
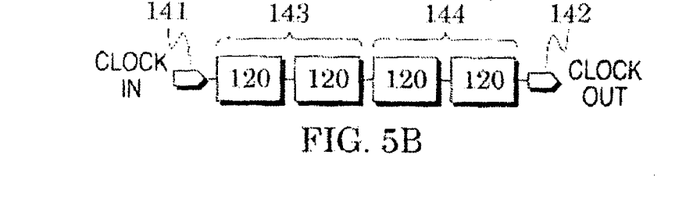
FIG. 5B is a diagram of another embodiment formed with the clock skewers of FIG. 5A.

A first one of the variable clock skewers 120 can be followed by a second one as shown in the skewer pair 143 that is arranged between ports 141 and 142 in the skewer 140 of FIG. 5B. The skewer pair 143 has the advantage that it permits skewing of both edges of clock signals. That is, first clock edges are skewed in the inversion process of a first clock skewer and second clock edges are skewed in the inversion process of a succeeding second clock skewer. The total delay range can then be extended by adding a second skewer pair 144 as shown in FIG. 5B. With the added second skewer pair, the total selectable delay can be doubled to 2.56 ps so that it can easily span the 2 ps resolution provided by the variable clock skewer 100 of FIG. 4B.

Figure 5C:
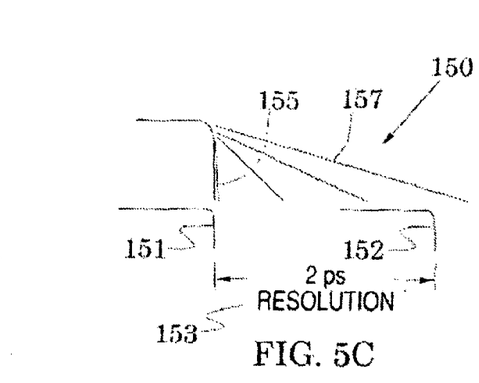
FIG. 5C is a sketch which illustrates the temporal relationship of variable delays of the variable clock skewer of FIG. 5A with each time segment of the variable clock skewers of FIGS. 4A and 4B.

The timing graph 150 of FIG. 5C is directed to events at the path portion 126. The graph illustrates the falling edge 151 of an output pulse that has passed through the variable clock skewer 122 of FIG. 4C prior to initiation of a least-significant bit of this skewer and through the inverter 122 of FIG. 5A with the delay command $C_{dly}$ set to its minimum value. The timing graph also illustrates the falling edge 152 of an output pulse that has passed through the variable clock skewer 100 after initiation of the least-significant bit and through the inverter 122 of FIG. 5A with the delay command $C_{dly}$ again set to its minimum value. These edges define (e.g., bound) the delay resolution offered by the variable clock skewer 100. In an exemplary realization of the skewer 100, this resolution was stated to be on the order of 2 ps.

FIG. 5C also shows the falling edge 155 of a pulse that has passed through the same clock path as edge 151 but with the delay command $C_{dly}$ set to a value slightly greater than its minimum value. As the combined resistance of the triode-biased transistors in these skewers progressively increases in response to the delay command $C_{dly}$, the inverter 122 progressively requires greater times to charge parasitic path capacitances and thereby change the state of the output. Accordingly, clock edges become shallower and shallower as exemplified by different falling edges that terminate in falling edge 157. A pulse traveling through the variable delay skewer of FIG. 5B can thereby be selectively delayed to span the resolution 153. Accordingly, these variable delays can span the resolution of the variable clock skewer 100 of FIG. 4C and can be selectively set to obtain a finer resolution (e.g., 20 fs) by the delay command $C_{dly}$.

The variable clock skewer 120 has a current transistor 130 and skew transistors 132-139 inserted in series with inverter transistor 124. In another clock skewer embodiment, opposite polarity versions of these transistors may be inserted in series with the inverter transistor 123 as indicated by insertion arrow 158 in FIG. 5A. In this clock skewer embodiment, both rising and falling clock edges are selectively delayed in a single clock skewer. Additional delay may be provided by a second identical clock skewer which also adds the advantage that the polarity of clock pulses is preserved as they pass through the pair of clock skewers. If only one clock skewer is used, this polarity preservation can be obtained by following the skewer with a simple inverter.

In yet another variable clock skewer embodiment, the delay structures of FIGS. 4C and 5A can be combined by substituting the structure of FIG. 5A for either of the inverters 81 and 82 in FIG. 4C. Because this embodiment reduces the number of inverters in the clock path, it further reduces clock jitter.

Having described several variable clock skewer structures, it is noted that delay time embodiments of the invention are generally defined in terms of the time to change the state at the output of a clock-transmission device (e.g., a gate or inverter). The delay is typically the time required to provide the necessary charge to change the voltage on capacitances that load the output of the transmission device. The capacitance may be the parasitic capacitance on the path portion. Alternatively, it may the sum of this capacitance and the capacitance of an added capacitor.

Different system embodiments may add structure that selectively controls currents associated with the parasitic capacitance and/or may selectively add capacitors to the parasitic capacitance and add current-directing transistors arranged to control currents associated with the added capacitors.

Attention is now directed to the arbitrators 38 of FIG. 2. In the interleaved system 20 of FIG. 1, the sampler in each of the converters 22 necessarily has a sample time that occupies one or more periods of the system clock and a hold time that occupies a subsequent multiple of the system's clock period. Because the sample times of all converters occur in succeeding periods of the system clock and the hold times also occur in succeeding periods, the sample time of one converter will begin at approximately the same time that the sample time of another converter is ending.

The present invention observes that if the beginning of the sample time of one converter of the system 20 of FIG. 1 is allowed to intrude into the end of the sample time of another, the initiation of sampling will possibly disturb the analog input signal and corrupt the accuracy of the sampled value in the latter converter. The invention also observes that one or more of the other converters may be between the start and end of their sample time at the end of the sample time of the converter under discussion. This action, however, will not disturb the analog input signal and, hence, the accuracy of the sampled value in the latter converter.

From these observations and considering a system with N converters that have a sampling time of N/2 periods of the system clock, it has been found that sample disturbances will be substantially avoided by assuring that the skewed clock for one converter is passed to that converter only in the presence of fewer than N/2 of the skewed clock signals. For example, the skewed clock for one converter in a four converter system should be passed to that converter only in the presence of one of the skewed clock signals.

Figure 6:
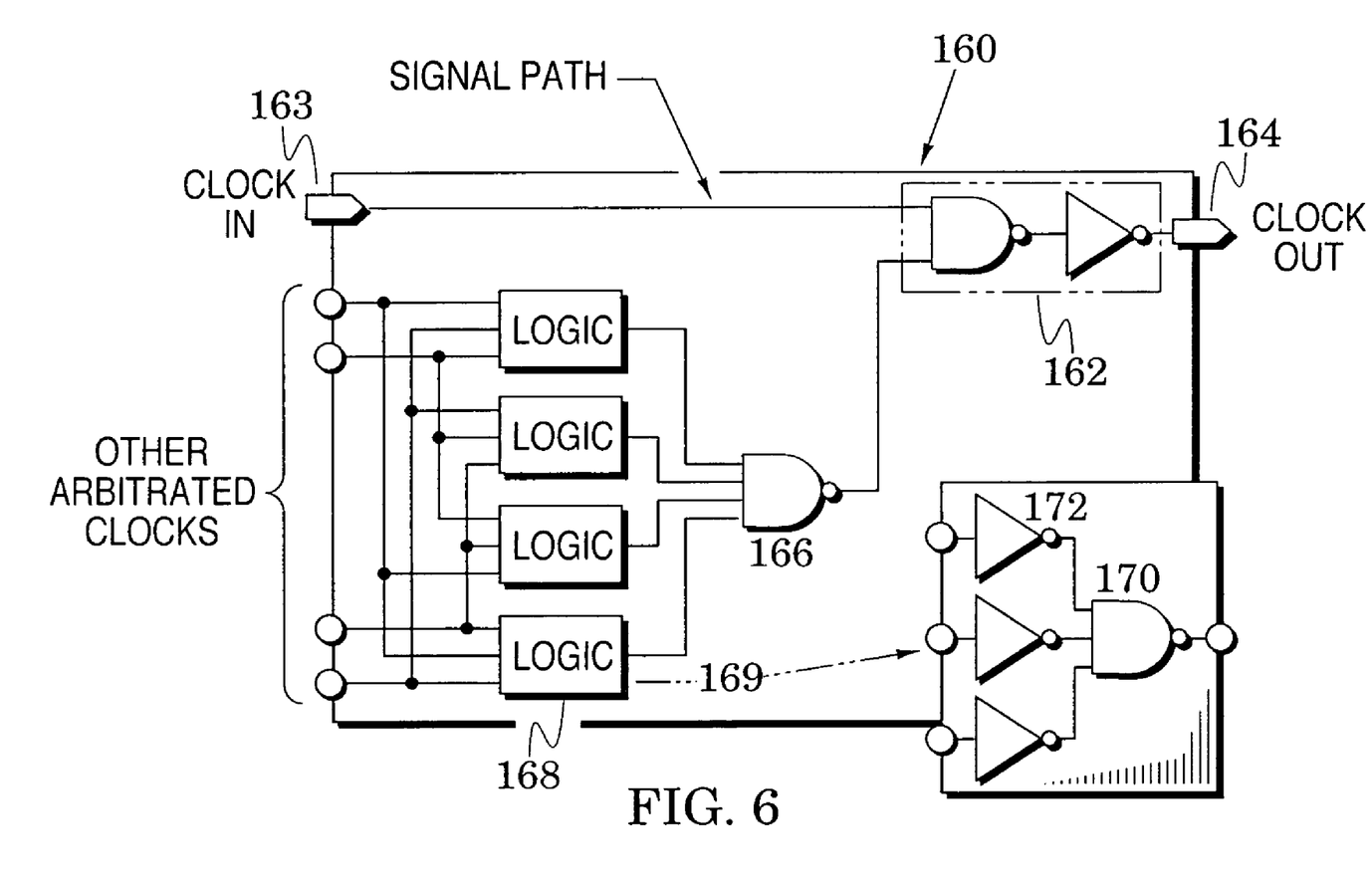
FIG. 6 shows an embodiment of an arbitrator in the clock system of FIG. 2.

FIG. 6 illustrates an arbitrator embodiment 160 for a five converter system with a maximum system clock rate of $4R_{max}$ (wherein $R_{max}$ is the maximum clock rate). It inserts an arbitration gate 162 (preferably formed with a NAND gate and an inverter to enhance speed and decrease current demand) into a signal path between ports 163 and 164. A NAND gate 166 drives the arbitration gate 162 in response to logic structures 168 that are each driven by a respective three of the remaining four clock signals (29 in FIG. 1). An example arrow 169 indicates that each of the structures 168 is formed with a NAND gate 170 that is driven by three inverters 172.

It is apparent that the arbitration gate 162 will be open (i.e., pass clock signals) if the output of at least one of the logic structures 168 is low. It is apparent from the example arrow 169 that the latter condition will exist only when all three (N−2) inputs of at least one of the logic structures are low. That is, only when N−2 of the outputs of the other arbitrators (38 in FIG. 2) are low. The arrangement of the arbitrator 160 of FIG. 6 thus insures that the beginning of the sample time of one converter will not intrude into the hold time of another and thus the sampling of the latter converter will not be disturbed.

It was noted above that the fixed clock skewers of the invention (e.g., 40 of FIG. 3) define time segments T and inherently provide high slew rates with a consequent reduction of jitter. In contrast, the variable clock skewers (e.g., 100 of FIG. 4C) provide a variable delay that spans the time segments T. That is, the variable delay can be expressed as $(1+\Delta D)T$ wherein $\Delta D$ can be selectively varied between 0 and 1. A total delay of $[(N-1)+(1+\Delta D)]T$ can be provided by N−1 fixed time segments in addition to the variable delay which can provide an Nth time segment. If $\Delta D$ is set to 0, this total delay is NT. At the other extreme, if $\Delta D$ is set to 1, the total delay is (N+1)T.

Figure 7:
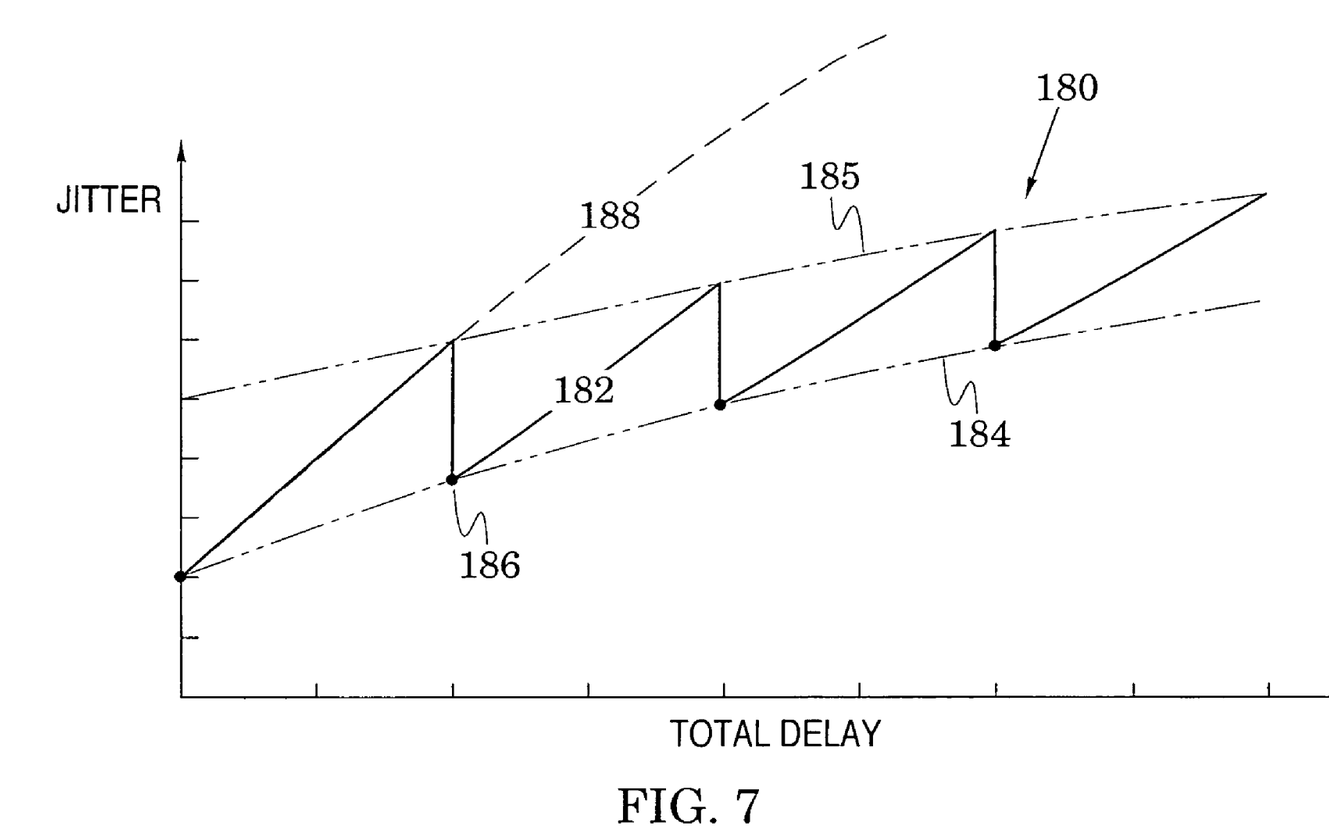
FIG. 7 illustrates jitter in fixed and variable clock skewer embodiments of the invention.

It can be shown that the jitter for this arrangement of fixed and variable clock skewers is proportional to $$t_{jitter} \propto T\sqrt{(N-1)+(1+\Delta D)^2} \quad (1)$$

which is shown as plot 182 in the graph 180 of FIG. 7 for a system in which N is four. This corresponds to the fixed clock skewer embodiment of FIG. 3 which has four fixed signal paths. By setting $\Delta D$ to zero and allowing N to take on non-integer values, the lower bound of equation (1) is found to be $$t_{jitter} \propto T\sqrt{N} \quad (2)$$

which is shown as plot 184 in FIG. 7. By setting AD to one and again allowing N to take on non-integer values, the upper bound of equation (1) is found to be $$t_{jitter} \propto T\sqrt{N+3} \quad (3)$$

which is shown as plot 185 in FIG. 7.

The intersections of the plots 182 and 184 of FIG. 6 are shown as dots 186 which are essentially separated by the time segments that are defined by the fixed clock skewers of the invention. It is apparent from FIG. 7 that each of these segments adds only a minimal amount of jitter as they follow the lower bound of plot 184. Although the variable clock skewers of the invention are necessary to span the time segments of the fixed clock skewers, they add comparatively more jitter. For example, the plot 188 indicates the additional jitter that would result if only variable clock skewers were used. Therefore, converter system embodiments of the invention arrange combinations of fixed and variable clock skewers to reduce jitter while realizing wide ranges of clock skews.

As indicated at the beginning of this description section, skewing networks and clock generators of the invention are generated with combinations of fixed and variable clock skewers which are especially configured to provide clock signals that are selectively-skewed to enhance system accuracy while simultaneously reducing jitter that typically accompanies such skewing.

Specific embodiments of these networks and generators may realize the fixed clock skewers with multiples of basic network gates and realize the variable clock skewers with delays that are less than that of a network gate. In other embodiments, the fixed clock skewers function by changing the number of network gates inserted into a clock path and the variable clock skewers function by altering clock edges within a network gate. It is noted that these are but a few of various embodiments that may be envisioned within the teachings of the invention.

It is noted that although the fixed and variable clock skewers (e.g., as shown in FIGS. 3, 4A-4C and 5A-5C) are preferably arranged between the steering gates 35 and the arbitrators 38 in the clock network 30 of FIG. 2, they may be arranged in any order between those latter elements (e.g., the fixed and variable clock skewers 36 and 37 can be interchanged).

It is further noted that the term gate is used in the present invention to refer to any digital logic element (e.g., inverter, NAND gate) that allows data to flow from one structure to another and in which the binary output value of the output depends on the input values.

The embodiments of the invention described herein are exemplary and numerous modifications, variations and rearrangements can be readily envisioned to achieve substantially equivalent results, all of which are intended to be embraced within the spirit and scope of the appended claims.

I claim:

1. A skew network that selectively delays a clock signal along a clock path in response to a delay command, the network comprising:
   a fixed clock skewer configured with fixed delays that differ by fixed time segments and further configured to insert, in response to said delay command, a selected one of said fixed delays into said clock path to thereby provide a selected one of said time segments; and
   a variable clock skewer configured to insert a variable delay into said clock path that can be varied to span said selected time segment and that can be selectively set by said delay command;
   said clock signal thereby selectively-skewed via selection of a respective time segment and selection therein of a variable delay.

2. The network of claim 1, wherein said fixed clock skewer includes a plurality of delay gates that are arranged to define a plurality of fixed signal paths whose delays differ by said time segments and arranged to insert a selected one of said fixed signal paths into said clock path in response to said delay command.

3. The network of claim 1, wherein said variable clock skewer includes:
   a clock-transmission device inserted in said clock path to initiate a downstream path portion; and
   at least one current-directing transistor arranged to couple a current to at least one of said device and said downstream path portion in response to said delay command.

4. The network of claim 3, wherein said clock-transmission device is a gate and further including a capacitor in series with said transistor.

5. The network of claim 3, wherein said clock-transmission device is an inverter.

6. The network of claim 1, wherein said variable clock skewer includes:
   first and second gates inserted in said clock path and spaced apart to define a path portion therebetween;
   a plurality of capacitors; and
   a plurality of transistors arranged to alter charge in selected ones of said capacitors via said path portion in response to said delay command.

7. The network of claim 1, wherein said variable clock skewer includes:
   an inverter inserted in said clock path and carrying an inverter current;
   and
   a plurality of triode-biased transistors arranged to determine said inverter current and selectively activated by said delay command.

8. The network of claim 1, wherein said variable clock skewer includes:
   first and second gates inserted in said clock path and spaced apart to define a path portion therebetween;
   a plurality of capacitors;
   a plurality of transistors arranged to alter charge in selected ones of said capacitors via said path portion in response to said command signal; and
   a plurality of triode-biased transistors arranged to determine a gate current of one of said first and second gates and activated by said delay command.

9. A clock generator that provides selectively-skewed interleaved clock signals in response to a system clock signal, comprising:
   a plurality of steering gates arranged and activated to selectively steer pulses of said system clock signal along respective clock paths to thereby generate said interleaved clock signals; and
   for each respective one of said clock paths, a skew network that responds to a respective delay command and includes:
      a fixed clock skewer configured with fixed delays that differ by fixed time segments and further configured to insert, in response to said delay command, a selected one of said fixed delays into said respective clock path to thereby provide a selected one of said time segments;
      and
      a variable clock skewer configured to insert a variable delay into said clock path that can be varied to span said selected time segment and that can be selectively set by said delay command;
   each of said interleaved clock signals thereby selectively-skewed via selection of a respective time segment and selection therein of a variable delay.

10. The generator of claim 9, wherein said fixed clock skewer includes a plurality of delay gates that are arranged to define a plurality of fixed signal paths whose delays differ by said time segments and arranged to insert a selected one of said fixed signal paths into said clock path in response to said delay command.

11. The generator of claim 9, wherein said variable clock skewer includes:
   a clock-transmission device inserted in said clock path to initiate a downstream path portion; and
   at least one current-directing transistor arranged to couple a current to at least one of said device and said downstream path portion in response to said delay command.

12. The generator of claim 11, wherein said variable clock skewer includes:
   first and second gates inserted in said clock path and spaced apart to define a path portion therebetween;
   a plurality of capacitors; and
   a plurality of transistors arranged to alter charge in selected ones of said capacitors via said path portion in response to said delay command.

13. The generator of claim 11, wherein said variable clock skewer includes:
   an inverter inserted in said clock path and carrying an inverter current;
   and
   a plurality of triode-biased transistors arranged to determine said inverter current and selectively activated by said delay command.

14. The generator of claim 9, wherein said variable clock skewer includes first and second clock skewers wherein said first clock skewer is configured to selectively insert first delays that differ by a delay step and said second clock skewer is configured to selectively insert second delays wherein said second delays can be varied to span said delay step.

15. The generator of claim 9, wherein there are N of said interleaved clock signals and further including, for each of said clock paths, a clock arbitrator configured to pass the respective one of said interleaved clock signals only in the absence of pulses of at least N/2 of said interleaved clock signals.

16. The generator of claim 15, wherein said clock arbitrator includes:
  an arbitration gate inserted into the respective clock path; and
  a generator of gates that condition said arbitration gate to pass the respective interleaved clock signal only in the absence of pulses of at least N/2 of said interleaved clock signals.

17. A signal converter system that converts an analog input signal to a corresponding digital code, comprising:
  a clock generator that provides selectively-skewed interleaved clock signals in response to a system clock signal and includes:
    a plurality of steering gates arranged and activated to selectively steer pulses of said system clock signal along respective clock paths to thereby generate said interleaved clock signals; and
    for each respective one of said clock paths, a skew network that responds to a respective delay command and includes:
      a fixed clock skewer configured with fixed delays that differ by fixed time segments and further configured to insert, in response to said delay command, a selected one of said fixed delays into said respective clock path to thereby provide a selected one of said time segments; and
      a variable clock skewer configured to insert a variable delay into said clock path that can be varied to span said selected time segment and that can be selectively set by said delay command;
  analog-to-digital converters that generate digital streams in response to said analog input signal and to respective ones of said selectively-skewed interleaved clock signals; and
  a multiplexer that combines said digital signals into said digital code.

18. The system of claim 17, wherein said fixed clock skewer includes a plurality of delay gates that are arranged to define a plurality of fixed signal paths whose delays differ by said time segments and arranged to insert a selected one of said fixed signal paths into said clock path in response to said delay command.

19. The system of claim 17, wherein said variable clock skewer includes:
  a clock-transmission device inserted in said clock path to initiate a downstream path portion; and
  at least one current-directing transistor arranged to couple a current to at least one of said device and said downstream path portion in response to said delay command.

20. The system of claim 17, wherein there are N of said interleaved clock signals and further including, for each of said clock paths, a clock arbitrator configured to pass the respective one of said interleaved clock signals only in the absence of pulses of at least N/2 of said interleaved clock signals.

* * * * *